United States Patent
Saurabh et al.

(10) Patent No.: US 11,983,278 B2
(45) Date of Patent: May 14, 2024

(54) SYSTEM AND METHOD FOR DATA ANONYMIZATION USING OPTIMIZATION TECHNIQUES

(71) Applicant: Tata Consultancy Services Limited, Mumbai (IN)

(72) Inventors: Saket Saurabh, Pune (IN); Arun Ramamurthy, Pune (IN); Sutapa Mondal, Pune (IN); Mangesh Sharad Gharote, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 468 days.

(21) Appl. No.: 17/395,677

(22) Filed: Aug. 6, 2021

(65) Prior Publication Data

US 2022/0343000 A1    Oct. 27, 2022

(30) Foreign Application Priority Data

Mar. 18, 2021 (IN) .............................. 202121011625

(51) Int. Cl.
  *G06F 17/12* (2006.01)
  *G06F 18/23* (2023.01)
  *G06F 21/60* (2013.01)

(52) U.S. Cl.
  CPC .............. *G06F 21/60* (2013.01); *G06F 17/12* (2013.01); *G06F 18/23* (2023.01)

(58) Field of Classification Search
  CPC .......... G06F 21/60; G06F 17/12; G06F 18/23; G06F 21/6254
  See application file for complete search history.

(56) References Cited

U.S. PATENT DOCUMENTS

2009/0018820 A1*  1/2009  Sato ..................... G06F 40/289
                                                                      704/9
2014/0317756 A1* 10/2014  Takahashi .......... G06F 21/6254
                                                                      726/26

(Continued)

OTHER PUBLICATIONS

Bredereck et al., "Pattern-Guided k-Anonymity," Algorithms, 6:678-701 (2013).

(Continued)

*Primary Examiner* — Farid Homayounmehr
*Assistant Examiner* — Mudasiru K Olaegbe
(74) *Attorney, Agent, or Firm* — Finnegan, Henderson, Farabow, Garrett & Dunner, LLP

(57) ABSTRACT

This disclosure relates generally to data anonymization using clustering techniques. In Typically, data anonymization using global recoding can overgeneralize the data. However, preservation of information while anonymization the data is of equal importance as obscuring the relevant information that can be used by the attackers. The disclosed method and system utilized attribute taxonomy tree for generalization to optimize the generalization of the records. The disclosed method uses clustering-based approach and after clustering, each cluster is solved independently using ILP model for K-Anonymization. The ILP model is solved by generalizing the value of the attributes. Sometimes, even after clustering the number of possible patterns is large, thus the disclosed method generates patterns on the fly during multiple iterations.

13 Claims, 6 Drawing Sheets

(56) References Cited

U.S. PATENT DOCUMENTS

| | | | | |
|---|---|---|---|---|
| 2019/0266353 | A1* | 8/2019 | Gkoulalas-Divanis | ..................... G06F 21/602 |
| 2020/0074221 | A1* | 3/2020 | Yi | ........................... G06F 30/20 |
| 2020/0252405 | A1* | 8/2020 | Sankavaram | ........... G06F 21/62 |
| 2021/0392160 | A1* | 12/2021 | Mo | ..................... H04L 63/1416 |
| 2021/0406474 | A1* | 12/2021 | Jalali | ....................... G06F 40/30 |

OTHER PUBLICATIONS

Goldberger et al., "Efficient Anonymizations with Enhanced Utility," Transactions on Data Privacy, 3:149-175 (2010).

Liang et al., "Optimization-Based k-Anonymity Algorithms," vol. 93, (2020).

Shaham et al., "Privacy Preserving Location Data Publishing: A Machine Learning Approach," (2019).

\* cited by examiner

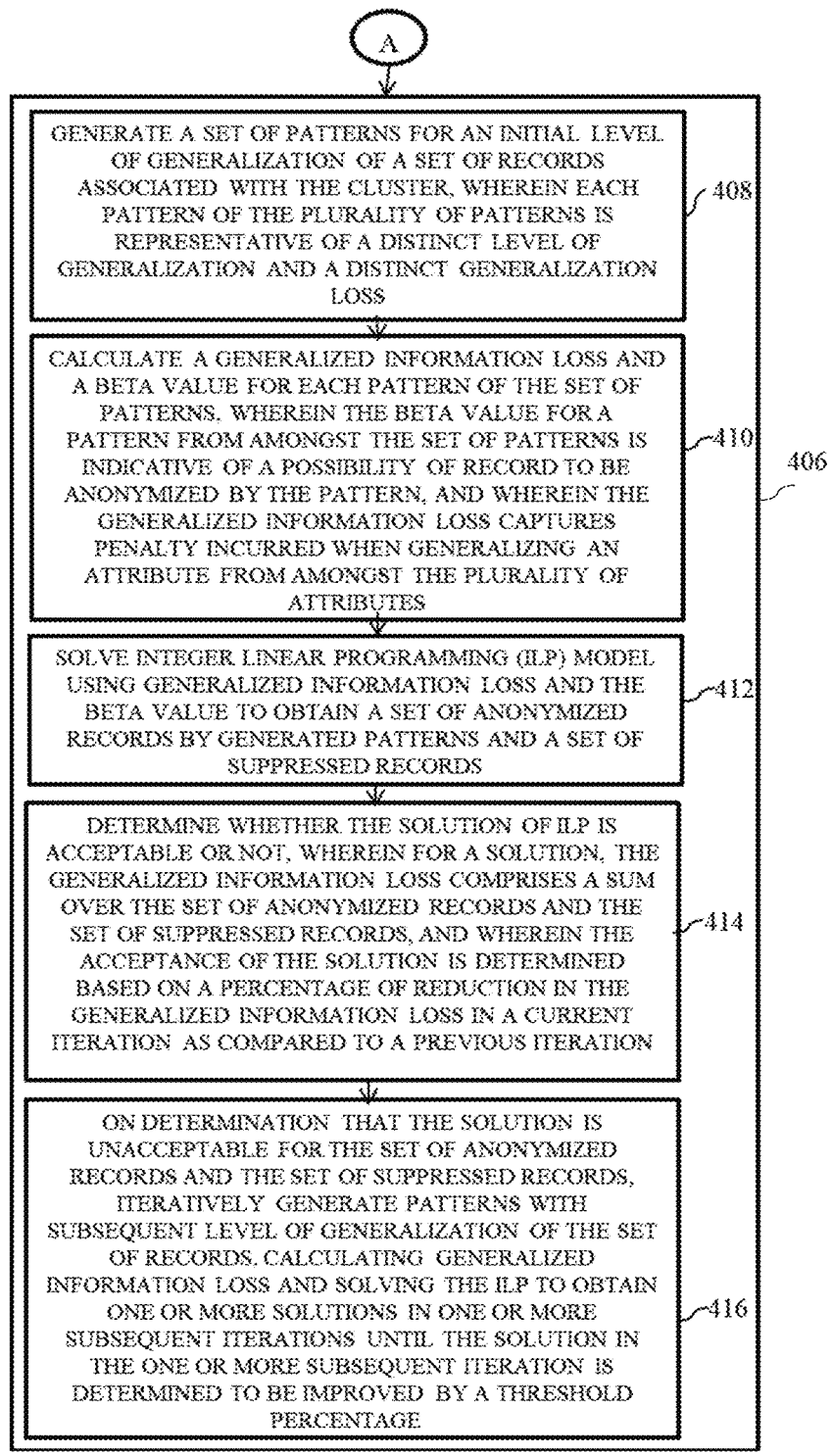
FIG. 4B  ← 400

SYSTEM AND METHOD FOR DATA ANONYMIZATION USING OPTIMIZATION TECHNIQUES

PRIORITY CLAIM

This US patent application claims priority under 35 U.S.C. § 119 to Indian application no. 202121011625, filed on 18 Mar. 2021. The entire contents of the aforementioned application are incorporated herein by reference.

TECHNICAL FIELD

The disclosure herein generally relates to data anonymization, and, more particularly, to system and method for data anonymization for privacy preserving data publication.

BACKGROUND

Data has value, and its importance is increasing rapidly. As a result, large amount of data is being collected from almost every aspect of human beings ranging from watching habits to shopping habits, health care to social media, internet browsing to reading habits. According to a Seagate and IDC report, IoT devices will create over 90 ZB data by 2025. This exponential growth in data can be both an opportunity and a threat.

Since more data is available, it can be used in real time fraud detection, efficient traffic flow management between smart vehicles and prioritized traffic protocol for emergency response vehicles facial recognition for improved security at common places. These applications require collecting and sharing of personal data. If such data is shared without any processing, it can be misused by attackers. It can severely harm any person emotionally and economically. For example, in the Cambridge Analytica data scandal 2018, a firm exploited user personal data to influence people's behaviors. Similarly, in the case of Cambridge Analytica, Facebook™ data was mined and used without authorization to build a software that predicted and influenced voters during the 2016 US Presidential Election. There are many more examples like Yahoo™, Sony™, Equifax™, Uber™, and JP Morgan Chase™ have been hit by cybersecurity attacks where the real names, email addresses, and telephone numbers of millions of users were compromised. To address this privacy challenge, data should be sanitized before sharing.

There are mainly two type of solutions to sanitize data. The first one is data anonymization-based approach. The other approach is synthetic data generation. Implementation of synthetic data generation methods are non-truthful, i.e. perturbative, as noise is added to original data. In many use cases, truthfulness is desired. There is growing interest for truthful data of hospital and medical data from governmental and industrial organizations.

In data anonymization-based approach, data should transform in such a way that each record should match to at least other k−1 records. This approach hides one person (or a record) among k persons (or records). There are two ways to achieve K-Anonymity, namely global recoding and local recoding.

In global recoding, K-anonymization is achieved by generalizing all records to same level of generalization. Although global recoding is time efficient, data utility loss is high. This loss in data utility is due to the unnecessarily high level of generalization. In contrast, in local recoding, K-Anonymization is achieved by generalizing different set of observations to different sets of generalization. An example of a global recoding and a local recoding are described further with reference to Tables, 1, 2 and 3. Herein, Table 2 is 2-anonymisation using Global recoding of Table 1, and Table 3 is 2-anonymisation using local recoding of Table 1. Local recoding preserves data utility at the expense of higher computational time.

TABLE 1

A Raw Table

| No. | Gender | Age | Zip | Problem |
|---|---|---|---|---|
| 1 | male | Middle | 4350 | stress |
| 2 | male | Middle | 4350 | obesity |
| 3 | male | Middle | 4350 | obesity |
| 4 | female | middle | 4352 | stress |
| 5 | female | old | 4354 | stress |
| 6 | female | old | 4353 | obesity |

TABLE 2

A Two-Anonymity view by Global Recoding

| No. | Gender | Age | Zip | Problem |
|---|---|---|---|---|
| 1 | * | middle | 435* | stress |
| 2 | * | middle | 435* | obesity |
| 3 | * | middle | 435* | obesity |
| 4 | * | middle | 435* | stress |
| 5 | * | old | 435* | stress |
| 6 | * | old | 435* | obesity |

TABLE 3

A Two-Anonymity view by Local Recoding

| No. | Gender | Age | Zip | Problem |
|---|---|---|---|---|
| 1 | male | middle | 4350 | stress |
| 2 | male | middle | 4350 | obesity |
| 3 | * | middle | 435* | obesity |
| 4 | * | middle | 435* | stress |
| 5 | female | old | 4353 | stress |
| 6 | female | old | 4353 | obesity |

SUMMARY

Embodiments of the present disclosure present technological improvements as solutions to one or more of the above-mentioned technical problems recognized by the inventors in conventional systems. For example, in one embodiment, a method for data anonymization is provided. The method includes obtaining a dataset comprising a plurality of records for anonymization, via one or more hardware processors, the plurality of records comprising a plurality of attributes arranged in a taxonomy tree structure. Further, the method includes clustering the dataset into a plurality of clusters using an extended M-mode clustering technique, via the one or more hardware processors. Furthermore, the method includes, performing, For each cluster of the plurality of clusters, via the one or more hardware processors generating a set of patterns for an initial level of generalization of a set of records associated with the cluster, wherein each pattern of the plurality of patterns is representative of a distinct level of generalization and a distinct generalization loss, calculating a generalized information loss and a beta value for each pattern of the set of patterns, wherein the beta value for a pattern from amongst the set of patterns is indicative of a possibility of record to be anonymized by the pattern, and wherein the generalized information loss captures penalty incurred when generalizing an attribute from amongst the plurality of attributes, solving integer linear programming (ILP) model using the generalized information loss and the beta value to obtain a set of anonymized records by generated patterns and a set of suppressed records, determining whether the solution of ILP model is acceptable or not, wherein for a solution, the generalized information loss comprises a sum over the set of anonymized records and the set of suppressed records, and wherein the acceptance of the solution is determined based on a percentage of reduction in the generalized information loss in a current iteration as compared to a previous iteration. Moreover, the method includes iteratively generating patterns with subsequent level of generalization of the set of records, calculating generalized information loss and solving the ILP model to obtain one or more solutions in one or more subsequent iterations until the solution in the one or more subsequent iteration is determined to be improved by a threshold percentage on determination that the solution is unacceptable for the set of anonymized records and the set of suppressed records.

In another aspect, a system for data anonymization is provided. The method includes a memory storing instructions, one or more communication interfaces; and one or more hardware processors coupled to the memory via the one or more communication interfaces, wherein the one or more hardware processors are configured by the instructions to obtain a dataset comprising a plurality of records for anonymization, the plurality of records comprising a plurality of attributes arranged in a taxonomy tree structure. The one or more hardware processors are configured by the instructions to cluster the dataset into a plurality of clusters using an extended M-mode clustering technique. Further, the one or more hardware processors are configured by the instructions to perform, for each cluster of the plurality of clusters, generate a set of patterns for an initial level of generalization of a set of records associated with the cluster, wherein each pattern of the plurality of patterns is representative of a distinct level of generalization and a distinct generalization loss, calculate a generalized information loss and a beta value for each pattern of the set of patterns, wherein the beta value for a pattern from amongst the set of patterns is indicative of a possibility of record to be anonymized by the pattern, and wherein the generalized information loss captures penalty incurred when generalizing an attribute from amongst the plurality of attributes, solve integer linear programming (ILP) model using the generalized information loss and the beta value to obtain a set of anonymized records by generated patterns and a set of suppressed records, determine whether the solution of ILP model is acceptable or not, wherein for a solution, the generalized information loss comprises a sum over the set of anonymized records and the set of suppressed records, and wherein the acceptance of the solution is determined based on a percentage of reduction in the generalized information loss in a current iteration as compared to a previous iteration and on determination that the solution is unacceptable for the set of anonymized records and the set of suppressed records, iteratively generate patterns with subsequent level of generalization of the set of records, calculate generalized information loss and solve the ILP model to obtain one or more solutions in one or more subsequent iterations until the solution in the one or more subsequent iteration is determined to be improved by a threshold percentage.

In yet another aspect, there are provided one or more non-transitory machine readable information storage mediums comprising one or more instructions which when executed by one or more hardware processors causes at least one of: obtaining a dataset comprising a plurality of records for anonymization, via one or more hardware processors, the plurality of records comprising a plurality of attributes arranged in a taxonomy tree structure. Further, the method includes clustering the dataset into a plurality of clusters using an extended M-mode clustering technique, via the one or more hardware processors. Furthermore, the method includes, performing, For each cluster of the plurality of clusters, via the one or more hardware processors generating a set of patterns for an initial level of generalization of a set of records associated with the cluster, wherein each pattern of the plurality of patterns is representative of a distinct level of generalization and a distinct generalization loss, calculating a generalized information loss and a beta value for each pattern of the set of patterns, wherein the beta value for a pattern from amongst the set of patterns is indicative of a possibility of record to be anonymized by the pattern, and wherein the generalized information loss captures penalty incurred when generalizing an attribute from amongst the plurality of attributes, solving integer linear programming (ILP) model using the generalized information loss and the beta value to obtain a set of anonymized records by generated patterns and a set of suppressed records, determining whether the solution of ILP model is acceptable or not, wherein for a solution, the generalized information loss comprises a sum over the set of anonymized records and the set of suppressed records, and wherein the acceptance of the solution is determined based on a percentage of reduction in the generalized information loss in a current iteration as compared to a previous iteration. Moreover, the method includes iteratively generating patterns with subsequent level of generalization of the set of records, calculating generalized information loss and solving the ILP model to obtain one or more solutions in one or more subsequent iterations until the solution in the one or more subsequent iteration is determined to be improved by a threshold percentage on determination that the solution is unacceptable for the set of anonymized records and the set of suppressed records.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4A-4B is a flow chart illustrating a method for data anonymization in accordance with some embodiments of the present disclosure.

DETAILED DESCRIPTION OF EMBODIMENTS

Figure 1:
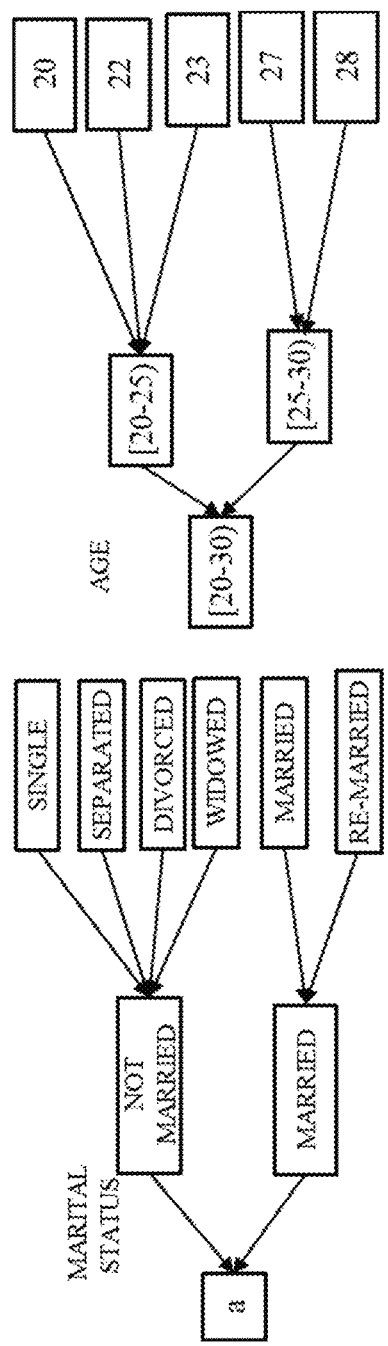
FIG. 1 illustrates an example representation of generalization loss computation for data anonymization according to some embodiments of the present disclosure.

Typically, data anonymization approaches can be categorized into three categories. The first category is random. In this category, randomization technique is used to perturb data and reconstructing statistics at an aggregate level. The second category is anonymization through cryptography. If there are two firms and each one has its own data and want to do computation on combined dataset without sharing to each other for preserving privacy.

The third Category is K-Anonymity. In this approach, data is anonymized by hiding an individual among k persons (or records). In k-anonymization approach, there are also two famous approaches. The first one is global recording. This method generalizes the data at domain level. A global recoding method can overgeneralize anonymization by local recoding. A known technique used clustering based technique to anonymized data, an integer linear programing (ILP) program was proposed to anonymized data through local recoding. Another known technique also proposed mathematical model to solve K-anonymization but this work only consider suppression strategy. Yet another also proposed MILP model for this problem but they did not consider attributes taxonomy. In many cases, generalizing value by attribute taxonomy can make more sense than random bucketing. Suppose that in bucket one, there is undergraduate and post-graduate and, in another bucket, there is post-graduate and 6th grade. Here former bucket preserves the information that the person attended higher school but any this type of interference is not possible in later bucket. So, considering taxonomy can preserve information while generalization.

The method and system disclosed in various embodiments of the present disclosure provides technical solutions for aforementioned technical problems existing in art. For example, the disclosed embodiments consider attributes taxonomy trees for generalization. The disclosed method provides a clustering and mathematical modelling-based optimization approach which generates K-anonymized sanitized data and is capable of achieving K-anonymity in local recording. The method uses a modified form of M-mode clustering technique, hereinafter referred to as extended M-mode clustering for achieving anonymization. The typical M-mode clustering algorithm uses binary dissimilarity (0 if two values are same, 1 of they are different) to measure the distance between two records in the dataset. However, the extended M-mode clustering disclosed herein a distance metric, known as WHD is used to compute distance between two records. The WHD based distance is appropriate for K-anonymization then the dissimilarity-based distance. In an embodiment, the disclosed method uses extended m-mode clustering algorithm to cluster the records of the dataset and Integer Linear programming (ILP) model to solve each cluster independently. Additionally, the method proposes to generate patterns in iterative manner which leads to decreasing the solution time of the ILP model.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 6, where similar reference characters denote corresponding features consistently throughout the figures, there are shown preferred embodiments and these embodiments are described in the context of the following exemplary system and/or method.

Glossary of Terms Used in Description of Various Embodiments

Definition 1 (Quasi-identifier attribute set): A quasi-identifier (QID) set is a set of attributes which can be linked together to identify individual in the table of records (or dataset). For example, attribute set {Gender, Age, Zip code} in Table 1 is a quasi-identifier. Table 1 can be used to get the information of individual of row 5 by linking Gender, Age and zip code.

Definition 2 (Equivalence class). An equivalence of a table is defined as set of records which have identical QID value for all QID attributes in the QID set. For example, record 1, 2, and 3 in Table 1 is one equivalence class.

Definition 3 (K-Anonymity property). Any table is said to be satisfy K-Anonymity property if the size of each equivalence class in an anonymized table is greater than or equal to k. Table 1 does not satisfy 2-Anonymity as equivalence class {female, old, 4354} has only one record in the table.

Definition 4 (K-Anonymization) It is a process to transform any table to a table which satisfy K-anonymity property. There are two ways for k-Anonymization, namely global recoding and local recoding. In global recoding, the generalization happens in domain. When an attribute value is generalized, every occurrence of the value is replaced by the same new generalized value. In local recoding, generalization happen at a cell level. For any value, many different levels of generalization value can co-exist in the anonymized table. As in global generalization, generalization happen at the domain level, so there is more data distortion.

Definition 5 (Generalized Information Loss (GenILoss)) Data Utility is an important part of data anonymization. In the present embodiments, this metrics (GenILoss) is used to quantify data utility. This metrics capture the penalty incurred when generalizing a specific attribute, by quantifying the fraction of the domain values that have been generalized.

Let $L_i$ and $U_i$ are the lower limit and upper limit of attribute i respectively. A record j entry for attribute i is generalized by lower limit $L_{ij}$ and upper limit $U_{ij}$. The overall information loss of an anonymized table T* is calculated as:

$$GenILoss(T^*) = \frac{1}{|T| \cdot n} X \sum_{i=1}^{n} \sum_{j=1}^{|T|} \frac{U_{ij} - L_{ij}}{U_i - L_i} \quad (1)$$

Where T is original table, n is the number of attributes and |T| is number of records.

This metrics (GenILoss) is based on the fact that given a generalized value of attribute which have larger range, has less precision than specific value which have smaller range. Here, lower the value, the better it is. Value 'zero' represent no transformation and the value of '1' represent full suppression or maximum level of generalization of attribute. This above defined formula is defined for numerical attributes. This metric is also defined for categorical attributes. Here, each leaf node is mapped to integer and the above formula can be applied.

Illustration For marital status refer FIG. 1, single is mapped to 1, separated mapped to 2 and so on till remarried to six. The GenILoss for the cell value "not married" is $$\frac{4-1}{6-1} = \frac{3}{5}.$$

Numerator represent that 'not married' is a generalized form of [1,4]. For age, which is numerical attribute, the GenILoss for cell value with the value [25-30] is $$\frac{29-25}{29-20} = \frac{4}{9}$$

Definition 6 (Generalization height) Each of the attributes can be generalized to different level according to its taxonomy tree. The level to which the value is generalized is referred to as generalization height.

Definition 7 (Level): Sum of generalization height of all the attributes of a record is defined as level of generalization for that record.

Figure 2:
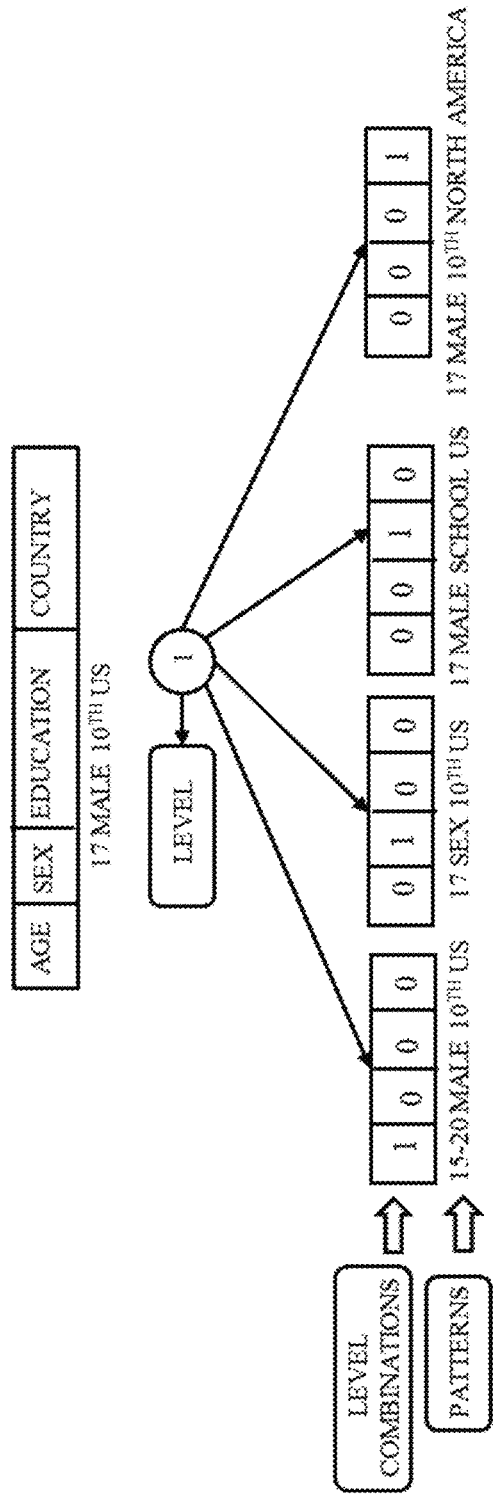
FIG. 2 illustrates an example of pattern generation through records and level combinations for data anonymization according to some embodiments of the present disclosure.

Definition 8 (Level Combination) A record can be generalized into many ways depend on the number attributes and their taxonomy trees height. For a given level, all the possible combination of generalization is level combination. FIG. 2 is showing all level combinations for level 1.

Definition 9 (Weighted Hierarchical Distance). Let h be the height of domain generalization of a given attribute and generalization heights are defined as 1, 2, . . . h−1, h from most specific to most general. Let the weight of generalization from generalization from j−1 to j is $w_{j-1,j}$, where 2≤j≤h. When a cell is generalized from level p to q, where p<q. The weighted hierarchical distance of this generalization is defined as:

$$WHD(pq) = \frac{\sum_{j=p+1}^{q} w_{j-1,j}}{\sum_{j=2}^{h} w_{j-1,j}} \quad (2)$$

Definition 10 (Patterns) It is a generalization of a record. Patterns are generated through level combination and records. FIG. 2 shows how patterns are generated through records and level combinations. First, for a given level, all possible level combinations are created as shown in FIG. 2. Then patterns are formed by generalizing each attribute to the generalization height mention in the level combinations. A method for generation of patterns is described further with reference to Algorithm 2 in the description below.

Figure 3:
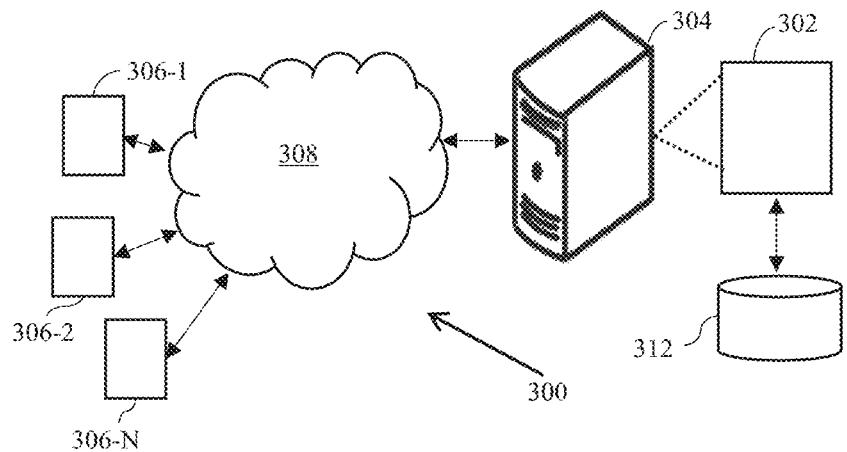
FIG. 3 illustrates an exemplary network implementation of a data anonymization system according to some embodiments of the present disclosure.

FIG. 3 illustrates an exemplary network implementation 300 of a system 302 for data anonymization according to some embodiments of the present disclosure. The disclosed system 302 is capable of solving K-Anonymization problem as a mathematical optimization problem. For instance, assuming that a dataset has a plurality of records (for example, n records) and a plurality of patterns (for example, m patterns). In the anonymized table, each record is going to be replaced with a pattern. To satisfy K-Anonymity condition either a pattern should be appear at least k times or zero time in the anonymized table. All possible generalization of each record are represented by the subset of the total patterns. So, each records must be replaced by one of these patterns only in the anonymized table. Each pattern represent different level of generalization and so information loss. Herein, the disclosed system provides an optimization model to minimize information loss and at the same time satisfy above mentioned constraint.

In an embodiment, the optimization model includes an integer linear programming (ILP) model for k-anonymization. The disclosed ILP contains binary variables $z_p$ which takes value 1 if pattern p is used to anonymize any record else 0. Other type of the binary variables are $y_{ip}$ which takes value 1 if record i gets anonymized by pattern p else zero. In additions to variables, the disclosed ILP model contains $\beta_{ip}$ as a parameters which have value 1 if pattern p can be used to anonymize the record i (for record i, there exist a level combination through which pattern p can be generated), else 0. Other parameter is K, which is K of K-Anonymity. The are variables and parameters for the disclosed ILP are presented below.

$$\beta_{ip} = \begin{cases} 1 \text{ if record } i \text{ can be anonymized by patter } p \\ 0 \text{ otherwise} \end{cases}$$

$$z_p = \begin{cases} \text{if pattern } p \text{ is used in anonymization} \\ 0 \text{ otherwise} \end{cases}$$

$$y_{ip} = \begin{cases} \text{if record } i \text{ is anonymized by pattern } p \\ 0 \text{ otherwise} \end{cases}$$

The disclosed ILP model is presented as below:

$$\min \Sigma_{k \in K} \text{UtiLoss}_p \cdot z_p = 1 \forall i \quad (3)$$

$$\Sigma_{p \in P} y_{ip} = 1 \forall i \quad (4)$$

$$y_{ip} \leq \beta_{ip} z_p \forall i, p \quad (5)$$

$$\Sigma_{i \in I} y_{ip} \geq K \cdot z_p \forall p \quad (6)$$

$$y_{ip} z_p \in \{0,1\} \forall i, p \quad (7)$$

Equation 4 ensures that every record must be anonymized by one of these patterns. As from pattern generation, it is very clear that every pattern is generalization of a record. So different records have different pattern for same level of generalization. Hence while anonymizing a record with pattern, it should be anonymized by the pattern only which is generalization of given record. Equation 5 ensures this. Whenever the pattern is not a generalized form of a record, it ensures $y_{ip}$ to take value equal to zero. Equation 6 ensures K-Anonymity condition.

As described above, $y_{ip}$ and $z_p$ are the variables. Integrality constraint on variables $y_{ip}$ can be relaxed. So, $z_p$ is the only integer variable and the value of $z_p$ depend on the number of records and levels combinations. The number of level combinations depend on the number of the attributes and taxonomy trees associated with the attributes. Total number of combinations possible is $\Pi_{i=1}^{m} h_i$, where h is the height of taxonomy tree of attribute i. This number is going to increase very rapidly with increase in number of attributes. Patterns are going to be generated from these level combinations and records. Trillion of patterns are possible for adult dataset. There may also be duplicate patterns as many records will generate same patterns in higher of level of generalization. Even after removing duplicate patterns, the number of patterns may remain significantly high and give intractable ILP model which may be impossible to solve in limited time and computational resource. To make the aforementioned problem solvable, the disclosed system utilizes two strategies. The first strategy is to cluster the records and solve ILP model for each cluster independently and the second is to generate patterns in iterative manner. Both the strategies are described further in detail below.

Although the present disclosure is explained considering that the system 302 is implemented on a server, it may be understood that the system 302 may also be implemented in a variety of computing systems 304, such as a laptop computer, a desktop computer, a notebook, a workstation, a cloud-based computing environment and the like. It will be understood that the system 302 may be accessed through one or more devices 306-1, 306-2 . . . 306-N, collectively referred to as devices 306 hereinafter, or applications residing on the devices 306. Examples of the devices 306 may include, but are not limited to, a portable computer, a personal digital assistant, a handheld device, a smartphone, a tablet computer, a workstation and the like. The devices 306 are communicatively coupled to the system 302 through a network 308.

In an embodiment, the network 308 may be a wireless or a wired network, or a combination thereof. In an example, the network 308 can be implemented as a computer network, as one of the different types of networks, such as virtual private network (VPN), intranet, local area network (LAN), wide area network (WAN), the internet, and such. The network 306 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 308 may include a variety of network devices, including routers, bridges, servers, computing devices, storage devices. The network devices within the network 308 may interact with the system 302 through communication links.

As discussed above, the system 302 may be implemented in a computing device 304, such as a hand-held device, a laptop or other portable computer, a tablet computer, a mobile phone, a PDA, a smartphone, and a desktop computer. The system 302 may also be implemented in a workstation, a mainframe computer, a server, and a network server. In an embodiment, the system 302 may be coupled to a data repository, for example, a repository 312. The repository 312 may store data processed, received, and generated by the system 302. In an alternate embodiment, the system 302 may include the data repository 312.

The network environment 300 supports various connectivity options such as BLUETOOTH®, USB, ZigBee and other cellular services. The network environment enables connection of devices 306 such as Smartphone with the server 304, and accordingly with the database 312 using any communication link including Internet, WAN, MAN, and so on. In an exemplary embodiment, the system 302 is implemented to operate as a stand-alone device. In another embodiment, the system 302 may be implemented to work as a loosely coupled device to a smart computing environment. The components and functionalities of the system 302 are described further in detail with reference to FIGS. 4A-4B.

Figure 4A:
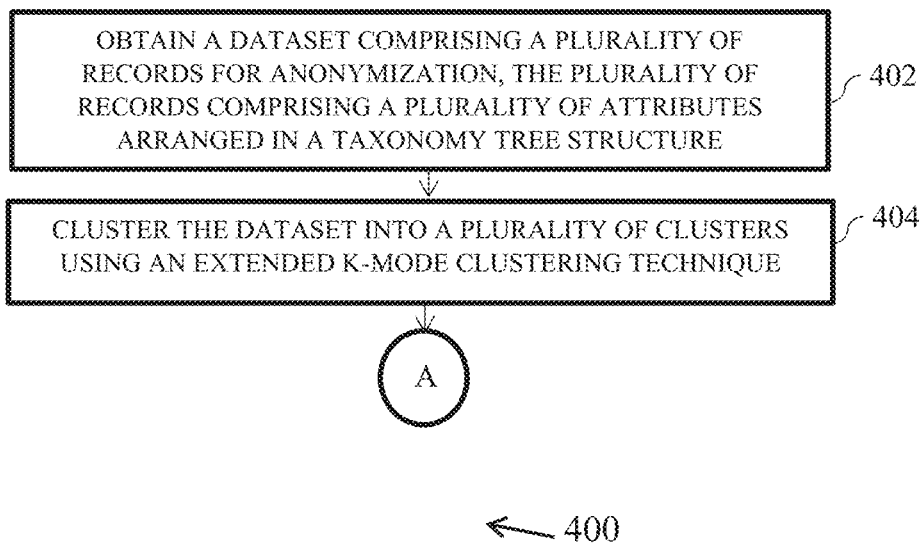

FIGS. 4A-4B illustrates an example flow chart of a method 400 for data anonymization using optimization techniques, in accordance with an example embodiment of the present disclosure. The method 400 depicted in the flow chart may be executed by a system, for example, the system, 302 of FIG. 3. In an example embodiment, the system 302 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 300. However, the operations of the method 400 can be described and/or practiced by using any other system.

At 402, the method 400 includes obtaining a dataset having a plurality of records for anonymization. The plurality of records includes a plurality of attributes arranged in a taxonomy tree structure. An example of the taxonomy tree structure of the attributes is described with reference to FIGS. 1 and 2. In an embodiment, the plurality of records may be in a tabular form in the dataset.

At 404, the method 400 includes clustering the dataset into a plurality of clusters using an extended M-mode clustering technique. Herein, the dataset may have mixed variable of type attributes in our dataset, so a clustering technique which should be applicable to categorical data is applicable. In extended M-Mode, WHD is used in place of Manhattan distance. Similarity of the two values is not considered in Manhattan distance. For example, the attribute 'marital status' having values 'married' and 'remarried' may need lower of generalization whereas values 'married' and 'divorced' need highest level of generalization. If Manhattan distance is considered, then distance between married and remarried and married and divorced is same i.e. One. Hence, using Manhattan distance may cause more information loss. Thus, using WHD can improve solution by making cluster of records which are closer in the taxonomy tree.

The method for clustering the dataset includes initiating, for each cluster from amongst the plurality of clusters, a mode from amongst the plurality of modes. A record is allocated to a cluster from amongst the plurality of clusters that is associated with a least value of Weighted Hierarchical Distance (WHD), and the mode of said cluster is updated after allocating the record to the cluster. Thereafter, the one or more records from amongst the set of records are iteratively allocated to one or more clusters having nearest mode in another cluster of the plurality of clusters until each record of the set of records are determined to be allocated to respective clusters. In order to iteratively allocate the one or more records, it is determined, for each record of the set of records associated with the cluster, whether the record has nearest mode in another cluster of the plurality of clusters. On determination of the record having the nearest mode in another cluster, the record is reallocated to the nearest cluster and the modes of the cluster and said another cluster are updated accordingly. The algorithm of the extended M-Mode clustering is presented as algorithm 1 below.
Algorithm 1: The Extended m-Mode Clustering Algorithm
Result: M partitions of data set
1. Initiate K centers, one for each cluster;
2. Allocate an object to the cluster which have least WHD. Update the mode of the cluster after allocation;
3. If a record belonging to a cluster is found to have its nearest mode in another cluster, reallocate the record to the nearest cluster and update the modes of both clusters;
4. Repeat 3 until no record have changed clusters after a full cycle test of the whole data set or number of iterations exceeds any fixed large number.

As previously mentioned, the number of possible patterns may be very large in a dataset. Even after clustering the dataset into a plurality of clusters, the number of possible patterns may be still large. To overcome this challenge, the disclosed method generates patterns on the fly, as will be described further with reference to step 406 (i.e. steps 408-416).

At 406, the method of generating patterns on the fly is initiated for each cluster of the plurality of clusters till some specified levels with these records. The method 406 includes generating a set of patterns for an initial level of generalization of a set of records associated with the cluster at 408. Herein, each pattern of the plurality of patterns is representative of a distinct level of generalization and a distinct generalization loss. In an embodiment, the method of generating patterns for a level of generalization includes creating, for the level of generalization, a set of possible level combinations. Thereafter, each attribute is generalized to a generalization height associated with the set of possible level combinations. As previously described, the generalization height is indicative of a maximum level of generalization of a value based on the attribute taxonomy tree to obtain the pattern. An algorithm to generate patterns in presented below:

---

Algorithm 2: Pattern GeneFation Process

Data: X,level
Result: Patterns. β. Gen|Loss
level_combinatlons ← All combinations possible for level ];
ArrayList Patterns ← [ ];
HashMap β ← { };
HashMap Gen|Loss ← { };
for combination ∈ level_combinations do
  For x ∈ X do
    pattern ← generalization(xi,combination);
    For x ∈ X do
      β[Pattern,i] ← 0;
    end
    if pattern ∈ Patterns then
      Add pattern to Patterns;
      β[Pattern,i] ← 1;
      Gen|Loss[pattern] ← penalty(pattern);
    else
      β[Pattern,i] ← 1;
    end
  end
end

---

At 410, a generalized information loss and a beta value for each pattern of the set of patterns is calculated. Herein, the beta value for a pattern from amongst the set of patterns is indicative of a possibility of record to be anonymized by the pattern. The generalized information loss (GenIloss) captures penalty incurred when generalizing an attribute from amongst the plurality of attributes, as described previously.

Herein, one pattern which is the suppression of all attributes is also added, thereby ensuring one feasible solution as all pattern are not generated. Some records may need higher level of generalization will lead to condition of infeasibility. Suppression is the highest level of generalization and every record can be anonymized by this pattern. This ensures that there may always be at least one feasible solution.

At 412, Integer Linear Programming (ILP) model is solved using the generalized information loss and the beta value. In the solution of ILP, some of the records may be anonymized by patterns with lower level of generalization and some may be suppressed (i.e. anonymized by the pattern which is highest level of generalization). For a solution of the ILP model, the generalized information loss includes a sum over the set of anonymized records and the set of suppressed records. The set of suppressed records have GenILoss as 1, and in these anonymization (the set of suppressed records), there is scope of improvement. Quality of solution can be improved by adding higher level of generalized patterns from the set of records. Patterns with higher level of generalization are generated with these records and corresponding beta value and the penalty is calculated.

At 414, it is determined whether the solution of ILP model is acceptable or not. Herein, the acceptance of the solution is determined based on a percentage of reduction in the generalized information loss in a current iteration as compared to a previous iteration. On determination that the solution is unacceptable for the set of anonymized records and the set of suppressed records at 416, subsequent iterations are performed, where each iteration includes iteratively generating patterns (or adding patterns) with subsequent level of generalization of the set of records, calculating generalized information loss and solving ILP model to obtain one or more solutions in one or more subsequent iterations. The plurality of iterations are performed until the solution in the one or more subsequent iterations is determined to be improved by a threshold percentage with respect to the previous iteration. In an embodiment, the threshold percentage may be around one percent.

In an embodiment, the subsequent level is computed by using following equation;

$$L_t = L_{t-1} + [K*f/N]$$

where, $L_t$ is level at the subsequent iteration (t),
$L_{t-1}$ is level at the iteration (t−1) prior to the subsequent iteration (t),
K represents K of K-Anonymization
F is an accuracy factor,
N is total number of records in the plurality of records, and
[ ] is greatest integer function.

Herein, the accuracy factor may be provided as user input. Smaller is the value of, higher is data utility on the anonymized data.

Herein, it will be noted that in each iteration records from which pattern are generated decreases, so, the ILP model size decreases significantly with each iteration.

Figure 5:
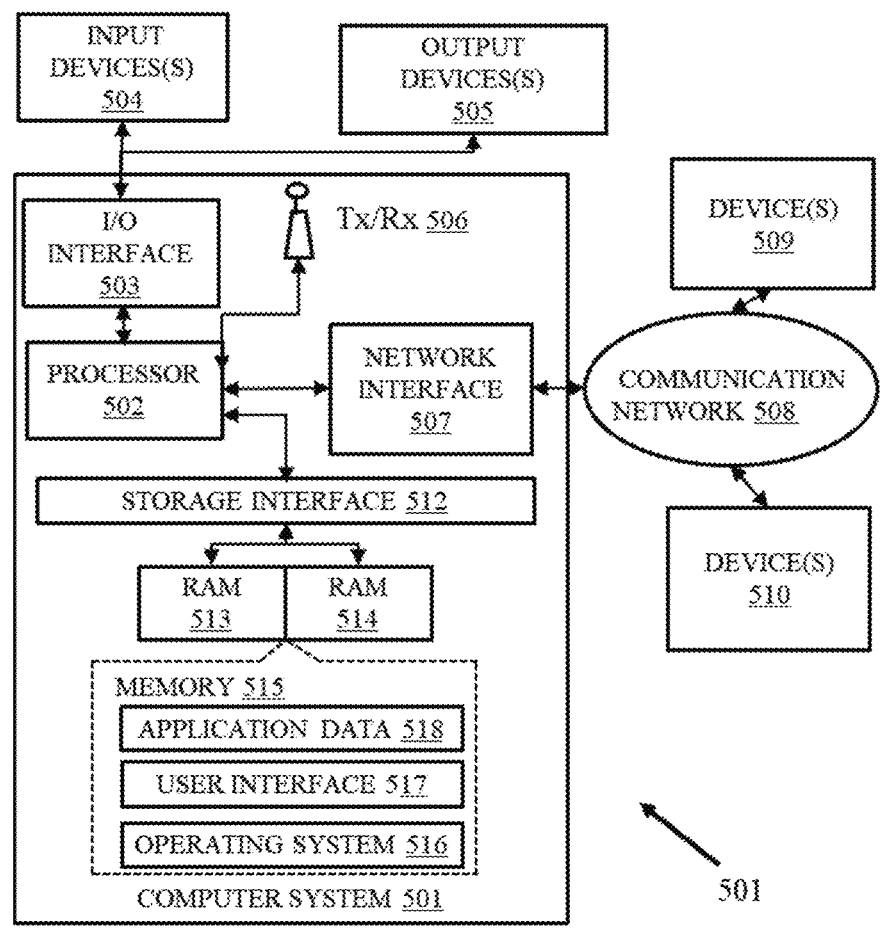
FIG. 5 is a block diagram of an exemplary computer system for implementing embodiments consistent with the present disclosure.

FIG. 5 is a block diagram of an exemplary computer system 501 for implementing embodiments consistent with the present disclosure. The computer system 501 may be implemented in alone or in combination of components of the system 302 (FIG. 3). Variations of computer system 501 may be used for implementing the devices included in this disclosure. Computer system 501 may comprise a central processing unit ("CPU" or "hardware processor") 502. The hardware processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 502 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 502 may be a multi-core multi-threaded processor.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 505 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of programs or database components, including, without limitation, an operating system 516, user interface application 517, user/application data 518 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 501 may store user/application data 318, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, (the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Example Scenario

The performance of the disclosed system in terms of loss in data utility upon anonymization. An experiment was performed to compare said loss with a prior art methodology.

TABLE 1

Dataset for example scenario

| S.No | Attribute | Cardinality | Generalization Height |
|---|---|---|---|
| 1 | Age | 74 | 4 |
| 2 | Gender | 2 | 1 |
| 3 | Race | 5 | 1 |
| 4 | Marital Status | 7 | 2 |
| 5 | Native County | 41 | 2 |
| 6 | Work Class | 8 | 2 |
| 7 | Occupation | 14 | 2 |
| 8 | Education | 16 | 3 |
| 9 | Salary Class | 2 | 1 |

An adult dataset for experimentation was considered. The dataset consist of 48842 records out of which 30000 records were considered for experimentation. Rows which have any missing value are dropped from dataset. Details of the dataset is mentioned in Table 1.

Figure 6:
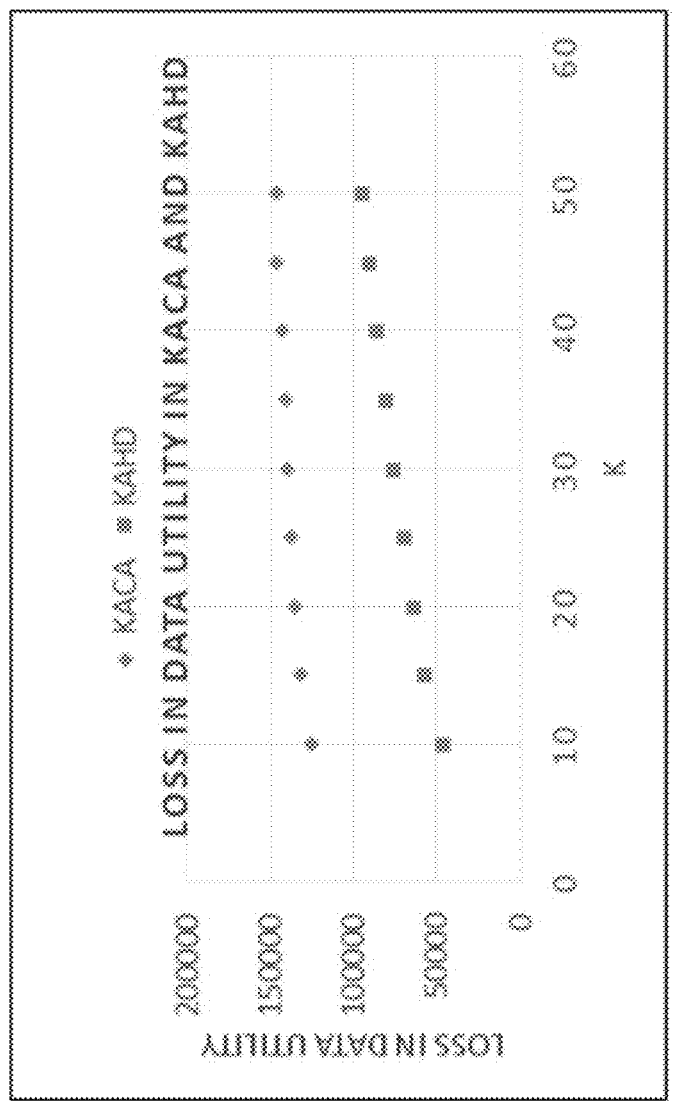
FIG. 6 illustrates variation of loss in data utility for values of K in accordance with an example embodiment of present disclosure.

As illustrated in FIG. 6, KAHD represents the proposed method and KACA is an algorithm from literature. The variation in FIG. 6 shows a comparison between KACA and KAHD performance with respect to data utility for different K values. It can be observed that KAHD is outperforming KACA for all values of K. It is also apparent that improvement achieved by KAHD is significantly high.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclose method and system for data anonymization. Typically, data anonymization using global recoding can overgeneralize the data. However, preservation of information while anonymization the data is of equal importance as obscuring the relevant information which can be used by the attackers. The disclosed method and system utilized attribute taxonomy tree for generalization.

The disclosed method uses clustering-based approach and after clustering, each cluster is solved independently using ILP model for K-Anonymization. The ILP model is solved by generalizing the value of the attributes. For example, a location "New Delhi" can be generalized to any one item from the list "[India, Asia, Northern Hemisphere, Location]". Sometimes, even after clustering the number of possible patterns is large, thus the disclosed method generates patterns on the fly during multiple iterations.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms"a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for data anonymization comprising:
    obtaining a dataset comprising a plurality of records for anonymization, via one or more hardware processors, the plurality of records comprising a plurality of attributes arranged in a taxonomy tree structure;
    clustering the dataset into a plurality of clusters using an extended M-mode clustering technique, via the one or more hardware processors;
    for each cluster of the plurality of clusters, performing, via the one or more hardware processors:
    generating a set of patterns for an initial level of generalization of a set of records associated with the cluster, wherein each pattern of the set of patterns is representative of a distinct level of generalization and a distinct generalization loss;
    calculating a generalized information loss and a beta value for each pattern of the set of patterns, wherein the beta value for a pattern from amongst the set of patterns is indicative of a possibility of record to be anonymized by the pattern, and wherein the generalized information loss captures penalty incurred when generalizing an attribute from amongst the plurality of attributes;
    solving an integer linear programming (ILP) model using the generalized information loss and the beta value to obtain a set of anonymized records by generated patterns and a set of suppressed records;
    determining whether the solution of the ILP model is acceptable or not, wherein for a solution, the generalized information loss comprises a sum over the set of anonymized records and the set of suppressed records, and wherein the acceptance of the solution is determined based on a percentage of reduction in the generalized information loss in a current iteration as compared to a previous iteration; and
    on determination that the solution is unacceptable for the set of anonymized records and the set of suppressed records, iteratively generating patterns with subsequent level of generalization of the set of records, calculating generalized information loss and solving the ILP model to obtain one or more solutions in one or more subsequent iterations until the solution in the one or more subsequent iteration is determined to be improved by a threshold percentage.

2. The method of claim 1, wherein generating the pattern for a level of generalization comprises:
    creating, for the level, a set of possible level combinations; and
    generalizing each attribute to a generalization height associated with the set of possible level combinations, wherein the generalization height is indicative of a maximum level of generalization of a value based on the attribute taxonomy tree to obtain the pattern.

3. The method of claim 1, wherein clustering the dataset into a plurality of clusters using the extended M-mode clustering comprises:
    initiating, for each cluster from amongst the plurality of clusters, a mode from amongst the plurality of modes;
    allocating a record to a cluster from amongst the plurality of clusters that is associated with a least value of Weighted Hierarchical Distance (WHD), and updating the mode of the cluster after allocating the record to the cluster; and
    iteratively reallocating one or more records from amongst the set of records to one or more clusters having nearest mode in another cluster of the plurality of clusters until each record of the set of records are determined to be allocated to respective clusters.

4. The method of claim 3, wherein iteratively reallocating the one or more records comprises:
    determining, for each record of the set of records associated with the cluster, whether the record has nearest mode in another cluster of the plurality of clusters; and
    on determination of the record having the nearest mode in another cluster, reallocating the record to the nearest cluster and update the modes of the cluster and the another cluster.

5. The method of claim 1, wherein the plurality of records are arranged in a tabular form.

6. The method of claim 1, wherein the subsequent level is computed by using following equation;

$$L_t = L_{t-1} + [K*f/N]$$

where, $L_t$ is level at the iteration (t) at the subsequent level,
$L_{t-1}$ is level at the iteration (t−1) previous to the subsequent level,
K represents K of K-anonymization
F is accuracy factor,
N is total number of records in the plurality of records, and
[ ] is greatest integer function.

7. A system, comprising:
    a memory storing instructions;
    one or more communication interfaces; and
    one or more hardware processors coupled to the memory via the one or more communication interfaces, wherein the one or more hardware processors are configured by the instructions to:
    obtain a dataset comprising a plurality of records for anonymization, the plurality of records comprising a plurality of attributes arranged in a taxonomy tree structure;
    cluster the dataset into a plurality of clusters using an extended M-mode clustering technique;
    for each cluster of the plurality of clusters, the one or more hardware processors are configured by the instructions to perform:
    generate a set of patterns for an initial level of generalization of a set of records associated with the cluster, wherein each pattern of the set of patterns is representative of a distinct level of generalization and a distinct generalization loss;
    calculate a generalized information loss and a beta value for each pattern of the set of patterns, wherein the beta value for a pattern from amongst the set of patterns is indicative of a possibility of record to be anonymized by the pattern, and wherein the generalized information loss captures penalty incurred when generalizing an attribute from amongst the plurality of attributes;
    solve an integer linear programming (ILP) model using the generalized information loss and the beta value to obtain a set of anonymized records by generated patterns and a set of suppressed records;

determine whether the solution of the ILP model is acceptable or not, wherein for a solution, the generalized information loss comprises a sum over the set of anonymized records and the set of suppressed records, and wherein the acceptance of the solution is determined based on a percentage of reduction in the generalized information loss in a current iteration as compared to a previous iteration; and on determination that the solution is unacceptable for the set of anonymized records and the set of suppressed records, iteratively generate patterns with subsequent level of generalization of the set of records, calculate generalized information loss and solve the ILP model to obtain one or more solutions in one or more subsequent iterations until the solution in the one or more subsequent iteration is determined to be improved by a threshold percentage.

8. The system of claim 7, wherein to generate the pattern for a level of generalization, the one or more hardware processors are configured by the instructions to:

create, for the level, a set of possible level combinations; and generalize each attribute to a generalization height associated with the set of possible level combinations, wherein the generalization height is indicative of a maximum level of generalization of a value based on the attribute taxonomy tree to obtain the pattern.

9. The system of claim 7, wherein to cluster the dataset into a plurality of clusters using the extended M-mode clustering, the one or more hardware processors are configured by the instructions to:

initiating, for each cluster from amongst the plurality of clusters, a mode from amongst the plurality of modes;

allocating a record to a cluster from amongst the plurality of clusters that is associated with a least value of Weighted Hierarchical Distance (WHD), and updating the mode of the cluster after allocating the record to the cluster; and iteratively reallocating one or more records from amongst the set of records to one or more clusters having nearest mode in another cluster of the plurality of clusters until each record of the set of records are determined to be allocated to respective clusters.

10. The system of claim 9, wherein to iteratively reallocate the one or more records comprises:

determining, for each record of the set of records associated with the cluster, whether the record has nearest mode in another cluster of the plurality of clusters; and on determination of the record having the nearest mode in another cluster, reallocating the record to the nearest cluster and update the modes of the cluster and the another cluster.

11. The system of claim 7, wherein the plurality of records are arranged in a tabular form.

12. The system of claim 7, wherein the subsequent level is computed by using following equation:

$$L_t = L_{t-1} + [K*f/N]$$

where, $L_t$ is level at the iteration (t) at the subsequent level, $L_{t-1}$ is level at the iteration (t−1) previous to the subsequent level, K represents K of K-anonymization F is accuracy factor, N is total number of records in the plurality of records, and

[ ] is greatest integer function.

13. One or more non-transitory machine readable information storage mediums comprising one or more instructions, which when executed by one or more hardware processors causes a method for:

obtaining a dataset comprising a plurality of records for anonymization, via one or more hardware processors, the plurality of records comprising a plurality of attributes arranged in a taxonomy tree structure;

clustering the dataset into a plurality of clusters using an extended M-mode clustering technique, via the one or more hardware processors;

for each cluster of the plurality of clusters, performing, via the one or more hardware processors:

generating a set of patterns for an initial level of generalization of a set of records associated with the cluster, wherein each pattern of the set of patterns is representative of a distinct level of generalization and a distinct generalization loss;

calculating a generalized information loss and a beta value for each pattern of the set of patterns, wherein the beta value for a pattern from amongst the set of patterns is indicative of a possibility of record to be anonymized by the pattern, and wherein the generalized information loss captures penalty incurred when generalizing an attribute from amongst the plurality of attributes;

solving an integer linear programming (ILP) model using the generalized information loss and the beta value to obtain a set of anonymized records by generated patterns and a set of suppressed records;

determining whether the solution of the ILP model is acceptable or not, wherein for a solution, the generalized information loss comprises a sum over the set of anonymized records and the set of suppressed records, and wherein the acceptance of the solution is determined based on a percentage of reduction in the generalized information loss in a current iteration as compared to a previous iteration; and on determination that the solution is unacceptable for the set of anonymized records and the set of suppressed records, iteratively generating patterns with subsequent level of generalization of the set of records, calculating generalized information loss and solving the ILP model to obtain one or more solutions in one or more subsequent iterations until the solution in the one or more subsequent iteration is determined to be improved by a threshold percentage.

* * * * *